(12) United States Patent
Jung

(10) Patent No.: US 7,961,686 B2
(45) Date of Patent: Jun. 14, 2011

(54) APPARATUS AND METHOD FOR PERFORMING HANDOVER USING COMPRESSED INFORMATION IN BROADBAND WIRELESS ACCESS COMMUNICATION SYSTEM

(75) Inventor: Jae-Dong Jung, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 867 days.

(21) Appl. No.: 11/870,831

(22) Filed: Oct. 11, 2007

(65) Prior Publication Data

US 2008/0095115 A1    Apr. 24, 2008

(30) Foreign Application Priority Data

Oct. 24, 2006  (KR) ........................ 10-2006-0103238

(51) Int. Cl.
   *H04W 4/00* (2009.01)
(52) U.S. Cl. ........................ 370/331; 455/436
(58) Field of Classification Search .................. None
   See application file for complete search history.

(56) References Cited

U.S. PATENT DOCUMENTS

| | | | | |
|---|---|---|---|---|
| 7,154,868 | B1* | 12/2006 | Sharma et al. | 370/331 |
| 7,742,452 | B2* | 6/2010 | Visotsky et al. | 370/331 |
| 2006/0003767 | A1* | 1/2006 | Kim et al. | 455/436 |
| 2006/0009224 | A1* | 1/2006 | Lim et al. | 455/442 |
| 2006/0035639 | A1 | 2/2006 | Etemad et al. | |
| 2007/0086387 | A1* | 4/2007 | Kang et al. | 370/331 |
| 2007/0281702 | A1* | 12/2007 | Lim et al. | 455/442 |
| 2009/0213833 | A1* | 8/2009 | Cai et al. | 370/350 |
| 2010/0178920 | A1* | 7/2010 | Kitazoe et al. | 455/436 |

FOREIGN PATENT DOCUMENTS

| | | |
|---|---|---|
| EP | 1 534 035 | 5/2005 |
| KR | 1020050116497 | 12/2005 |
| KR | 1020060032544 | 4/2006 |
| WO | WO 2005/122622 | 12/2005 |
| WO | WO 2006/079932 | 8/2006 |

OTHER PUBLICATIONS

Part 16: Air Interface for Fixed and Mobile Broadband Wireless Access Systems Amendment 2: Physical and Medium Access Control Layers for Combined Fixed and Mobile Operation in Licensed Bands, XP-002472090. IEEE 802.16e. Feb. 28, 2006.

* cited by examiner

*Primary Examiner* — Anh-Vu Ly
(74) *Attorney, Agent, or Firm* — The Farrell Law Firm, P.C.

(57) ABSTRACT

In the broadband wireless access communication system, handover using compressed information is performed by receiving a compressed broadcast message in a portable terminal, acquiring operator information and sector information from the compressed broadcast message, acquiring a preamble number from one of the compressed broadcast message and pre-stored information, identifying a cell and a sector based on the preamble number, the operator information, and the sector information, and when a sector of a handover target cell is a sector of another cell, executing inter-cell handover.

12 Claims, 7 Drawing Sheets

| SYNTAX | SIZE | NOTES |
|---|---|---|
| DL-MAP_MESSAGE FORMAT() { | | |
| MANAGEMENT MASSAGE TYPE = 2 | 8 BITS | |
| PHY SYNCHRONIZATION FIELD | VARIABLE | SEE APPROPRIATE PHY SPECIFICATION. |
| DCD COUNT | 8 BITS | |
| BASE STATION ID | 48 BITS | |
| BEGIN PHY SPECIFIC SECTION { | | SEE APPLICABLE PHY SECTION. |
| IF (WIRELESSMAN-OFDMA) { | | |
| NO. OFDMA SYMBOLS | 8 BITS | NUMBER OF OFDMA SYMBOLS IN THE DL SUBFRAME INCLUDING ALL AAS/ PERMUTATION ZONE. |
| } | | |
| FOR (I=1; I<= N; I++) { | | FOR EACH DL-MAP ELEMENT 1 TO N |
| DL-MAP_IE() | VARIABLE | SEE CORRESPONDING PHY SPECIFICATION. |
| } | | |
| } | | |
| IF !(BYTE BOUNDARY) { | | |
| PADDING NIBBLE | 4 BITS | PADDING TO REACH BYTE BOUNDARY. |
| } | | |
| } | | |

FIG.3
(PRIOR ART)

| SYNTAX | SIZE | NOTES |
|---|---|---|
| COMPRESSED_DL-MAP() { | | |
| COMPRESSED MAP INDICATOR | 2 BITS | SET TO BINARY 11 FOR COMPRESSED FORMAT |
| RESERVED | 1 BIT | SET TO 0 |
| UL-MAP APPENDED | 1 BIT | |
| CRC APPENDED | 1 BIT | |
| MAP MESSAGE LENGTH | 11 BITS | |
| PHY SYNCHRONIZATION FIELD | 32 BITS | |
| DCD COUNT | 8 BITS | |
| OPERATOR ID | 8 BITS | |
| SECTOR ID | 8 BITS | |
| DL IE COUNT | 8 BITS | |
| FOR { I = 1; I <= DL IE COUNT;I--){ | | |
| DL-MAP_IE() | VARIABLE | |
| } | | |
| IF !(BYTE BOUNDARY) { | | |
| PADDING NIBBLE | 4 BITS | PADDING TO REACH BYTE BOUNDARY |
| } | | |
| } | | |

FIG.4

(PRIOR ART)

APPARATUS AND METHOD FOR PERFORMING HANDOVER USING COMPRESSED INFORMATION IN BROADBAND WIRELESS ACCESS COMMUNICATION SYSTEM

PRIORITY

This application claims priority under 35 U.S.C. §119 to an application filed in the Korean Intellectual Property Office on Oct. 24, 2006 and assigned Serial No. 2006-103238, the contents of which are incorporated herein by reference.

BACKGROUND OF THE INVENTION

1. Field of the Invention

The present invention relates generally to a broadband wireless access communication system, and in particular, to an apparatus and method for preventing handover failure that may occur of a subscriber station (SS) recognizes a sector of another cell as a sector of a current cell when a radio access station (RAS) uses a compressed downlink-map (DL-MAP).

2. Description of the Related Art

Researchers are studying the fourth-generation (4G) communication systems, which are the next-generation communication systems, to provide users with services of diverse qualities of service (QoS) at a rate of about 100 Mbps.

Particularly, current 4G communication systems have a form of a broadband wireless access communication system, such as a Local Area Network (LAN) system and a Metropolitan Area Network (MAN), with mobility and quality of service added there to, and aim to provide services at a high data transmission rate. The representative communication systems are an Institute of Electrical and Electronics Engineers (IEEE) 802.16d communication system and an IEEE 802.16e communication system. The IEEE 802.16d and the IEEE 802.16e communication systems adopt an Orthogonal Frequency Division Multiplexing (OFDM)/Orthogonal Frequency Division Multiple Access (OFDMA) to provide a broadband service network on a physical channel in the wireless MAN system. The IEEE 802.16d system is a fixed subscriber station (SS) system, that is, the IEEE 802.16d system does not consider the mobility of the subscriber station but considers only a single cell architecture. The IEEE 802.16e communication system takes the mobility of the subscriber station into consideration. The subscriber station with a mobile property is referred to as a mobile station (MS) in the present invention. Hereinafter, both mobile station and subscriber station will be referred to as portable terminals. The portable terminal is defined to be all terminals that can be carried by a user.

The IEEE 802.16e communication system can acquire the optimal transmission efficiency when data is transmitted at a high transmission rate by maintaining orthogonality among multiple sub-carriers. Also, the system is highly efficient in its use of frequencies and it is strong against multi-path fading.

Also, the OFDM/OFDMA method uses a method of forming sub-channels by using sub-carriers, which are sharable resources, to increase a channel utility among multiple portable terminals and a base station in a cell, and allocating the sub-carriers to the portable terminals based on the sub-channels.

Non-limiting examples of the IEEE 802.16d system and the IEEE 802.16e system are World Interoperability for Microwave Access (Wimax) and Wireless Broadband (Wibro) or Mobile Wimax. Portable terminals with the Wibro technology are generally laptops with a Personal Computer Memory Card International Association (PCMCIA) or personal portable terminals such as a Personal Digital Assistant (PDA).

FIG. 1 illustrates a general IEEE 802.16e communication system. Referring to FIG. 1, the IEEE 802.16e communication system has a multiple cell structure. In other words, it has a predetermined cell 100, i.e., a first cell, and another cell 150, i.e., a second cell. The IEEE 802.16e communication system includes a first base station 110 in charge of the first cell 100, a second base station 140 in charge of the second cell 150, and a plurality of portable terminals 111, 113, 130, 151, and 153. Herein, the portable terminals 111, 113, 130, 151, and 153 transmit/receive signals to/from each other based on the OFDM/OFDMA method. Among the portable terminals 111, 113, 130, 151, and 153, when a portable terminal 130 is present in a boundary area between the first cell 100 and the second cell 150, portable terminal 130 may execute a handover. In other words, when the portable terminal 130 moves toward the second cell 150 controlled by the second base station 140 while transmitting/receiving to/from the first base station 110, handover occurs and the serving base station for the portable terminal 130 is changed from the first base station 110 to the second base station 140.

In the IEEE 802.16e communication system, a portable terminal identifies a sector within a predetermined cell by using a Base Station IDentification (BS ID) on a DownLink-MAP (DL-MAP). The base station provides the portable terminal with network information by periodically transmitting a MOBile NeighBoR ADVertisement (MOB_NBR-ADV) message, in order which is a broadcast message, to identify the cell to the portable terminal.

The DL-MAP of the MOB_NBR-ADV message includes a mapping table for Medium Access Control (MAC) addresses and indexes of adjacent base stations. The mapping table is maintained for each configuration change.

The base station may acquire a 48-bit ID of an adjacent base station from the indexes of the adjacent base stations included in a MOBile SCAN REPORT (MOB_SCAN-REPORT) message or a MOBile Station HandOver REQuest (MOB_MSHO-REQ) message based on the mapping table, and process a request from the portable terminal. The MOB_SCAN-REPORT message is a message reporting a result obtained by the portable terminal scanning the surroundings, and the MOB_MSHO-REQ message is a message transmitted by the portable terminal for handover.

FIG. 2 illustrates a typical structure of a BS ID of DL-MAP information. Referring to FIG. 2, a BS ID of a typical DL-MAP includes a three-byte operator ID, which is operator information, and a 3-byte sector ID, which is sector information. Thus, a BS ID is composed of a total of 48 bits.

FIG. 3 illustrates a general DL-MAP message format. Referring to FIG. 3, there is a 48-byte BS ID in a DL-MAP message.

FIG. 4 illustrates a general compressed DL-MAP message format. Referring to FIG. 4, a compressed DL-MAP message can be identified by the content in the two most significant bits (MSB) in the first data byte. When the first two bits are 11, a message is recognized as a compressed DL-MAP message.

Whereas a general DL-MAP message is assigned with 48 bits to represent a BS ID, a compressed DL-MAP message is assigned with a one-byte operator ID and a one-byte sector ID for a BS ID.

The portable terminal can receive a compressed DL-MAP of a serving cell, and receive a compressed DL-MAP of a target cell to which the portable terminal executes a handover.

However, when only two bytes are allocated as the cell information and the sector information just as in the compressed DL-MAP message and the portable terminal is present in an area where a plurality of cells are overlapped and the sector number of a handover target cell is the same as the sector number of the serving cell although the cells are different, the portable terminal may mistake a sector of the target cell as the sector of the current serving cell due to lack of information and thus execute inter-sector handover instead of inter-cell handover. Therefore, the portable terminal can hardly execute handover successfully.

SUMMARY OF THE INVENTION

An aspect of the present invention is to substantially solve at least the above problems and/or disadvantages and to provide at least the advantages below. Accordingly, an aspect of the present invention is to provide an apparatus and method for performing handover using compressed information in a broadband wireless access communication system.

Another aspect of the present invention is to provide an apparatus and method that can increase a handover success rate by identifying a base station according to a sector when a compressed DL-MAP is used in a broadband wireless access communication system.

According to one aspect of the present invention, in a method for performing handover based on compressed information in a broadband wireless access communication system, a portable terminal receives a compressed broadcast message. The portable terminal acquires operator information and sector information from the compressed broadcast message, and acquires a preamble number from one of the compressed broadcast message and pre-stored information. Subsequently, a cell and a sector are identified based on the preamble number, the operator information, and the sector information. When a sector of a handover target cell is identified as a sector of another cell after the identification of the cell and the sector, the portable terminal executes inter-cell handover.

According to another aspect of the present invention, in an apparatus for performing handover in a portable terminal based on compressed information in a broadband wireless access communication system, a compressed information manager receives a compressed broadcast message, acquires operator information and sector information from the compressed broadcast message, acquires a preamble number from one of pre-stored information and the compressed broadcast message, identifies a cell and a sector, and provides the identification result. A controller provides the compressed broadcast message to the compressed information manager, and when a sector of a handover target cell is identified as a sector of another cell based on the cell information and the sector information provided from the compressed information manager, the apparatus executes inter-cell handover.

BRIEF DESCRIPTION OF THE DRAWINGS

The above and other objects, features and advantages of the present invention will become more apparent from the following detailed description when taken in conjunction with the accompanying drawings in which:

FIG. 3 illustrates a general downlink-map (DL-MAP) message format;

FIG. 4 illustrates a general compressed DL-MAP message format;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and method using compressed information in a broadband wireless access communication system will be described.

The present invention provides for using a preamble number to identify a cell and a sector to prevent a portable terminal from failing in handover due to lack of information, when only two bytes are allocated as base station information (cell or sector information) in a compressed DL-MAP of a broadcast MOB_NBR-ADV message.

Figure 1:
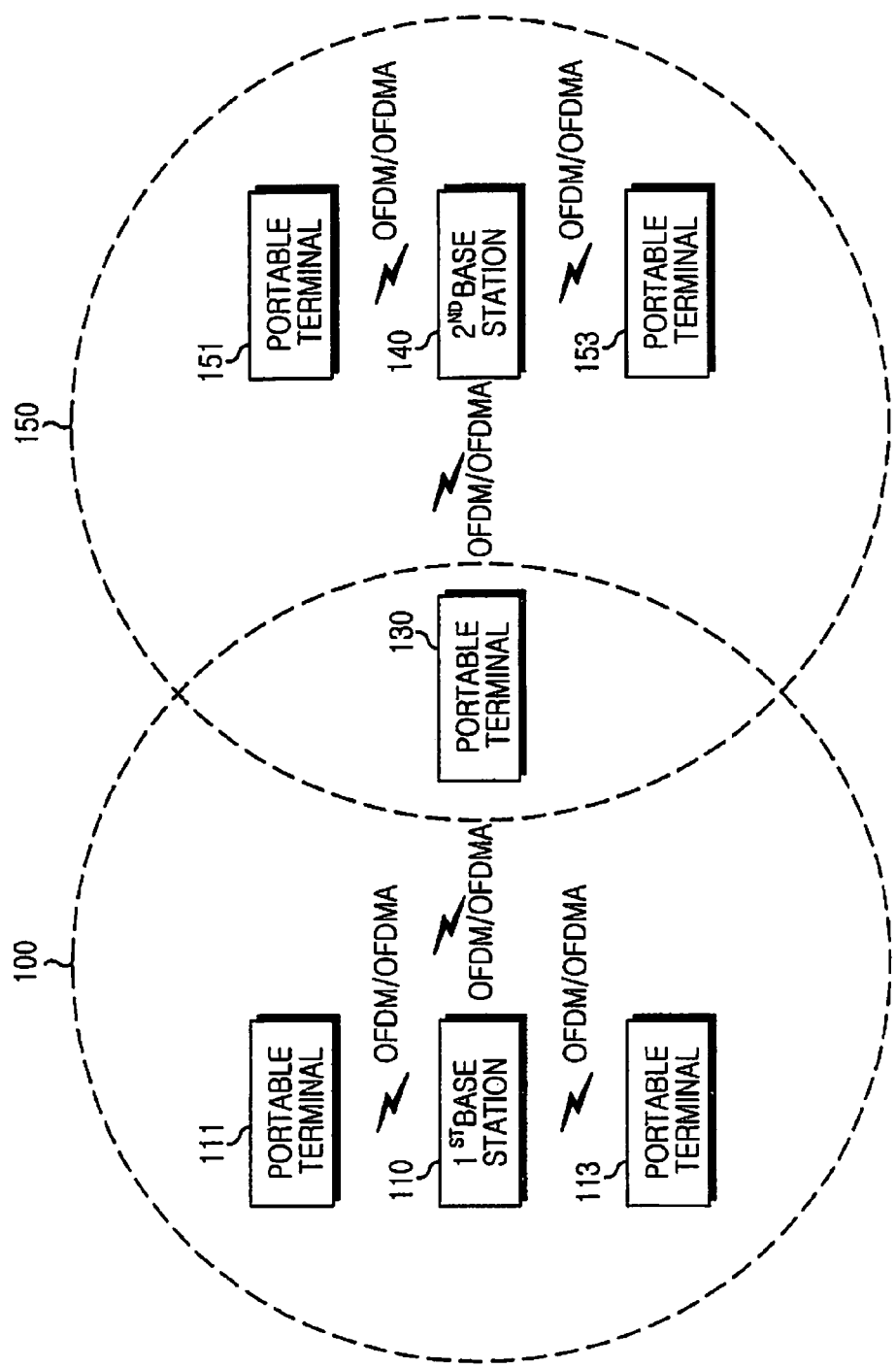
FIG. 1 illustrates a general Institute of Electrical and Electronics Engineers (IEEE) 802.16e communication system.
Figure 2:
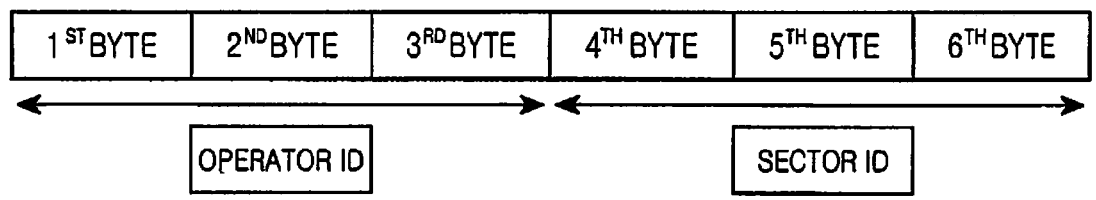
FIG. 2 illustrates a typical structure of a base station identification (BS ID) of DL-MAP information.
Figure 5:
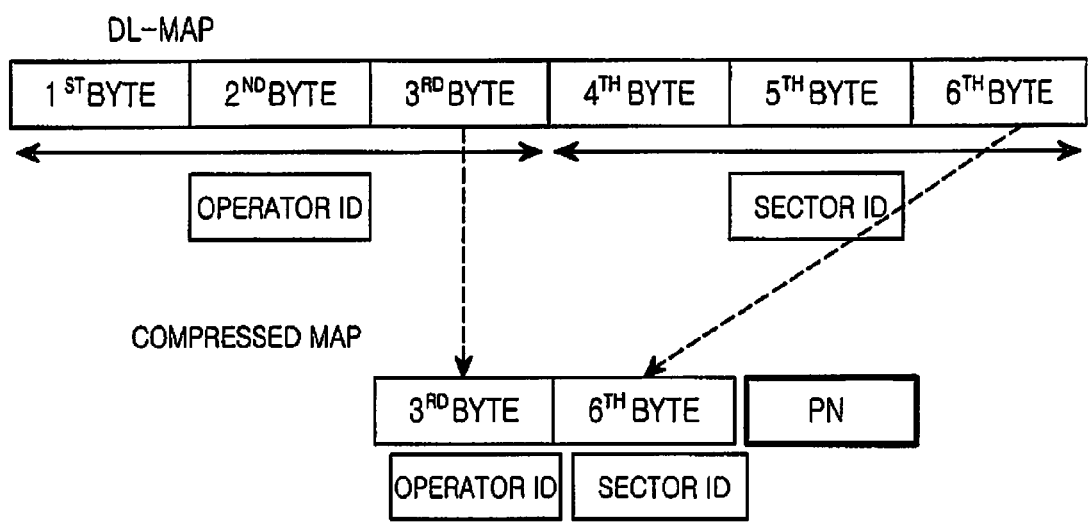
FIG. 5 illustrates a process of acquiring BS ID from compressed DL-MAP information according to the present invention.

FIG. 5 illustrates a process of acquiring BS ID from compressed DL-MAP information according to the present invention. Referring to FIG. 5, the portable terminal identifies the base station of a sector by using a preamble number (PN) in addition to a one-byte operator identifier (ID) and a one-byte sector ID included in a compressed DL-MAP.

The preamble number is independently allocated to each base station, and the portable terminal can identify the preamble number when it receives a downlink frame, i.e., a compressed DL-MAP. Therefore, the portable terminal can accurately identify to which base station a sector belongs to based on the preamble number, the operator ID, and the sector ID when the portable terminal receives the compressed DL-MAP.

Figure 6:
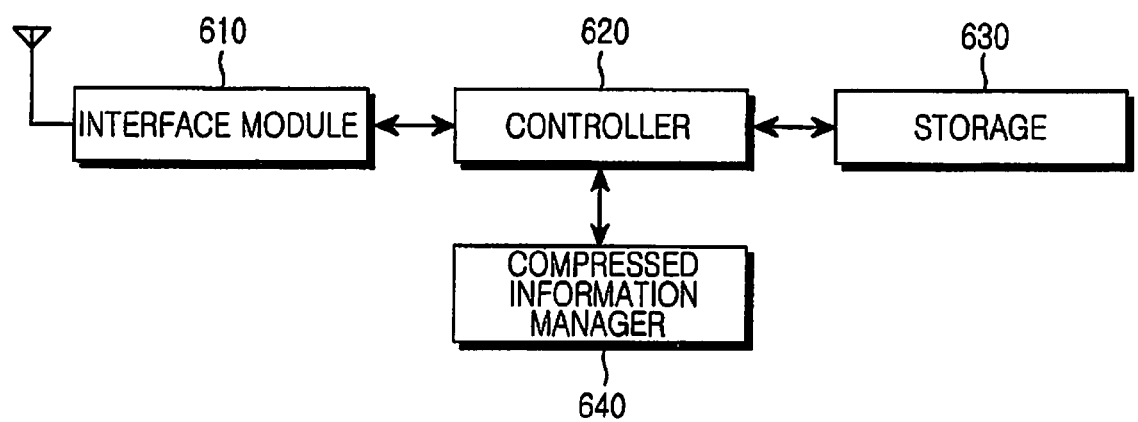
FIG. 6 is a block view showing a portable terminal according to the present invention.

FIG. 6 is a block view showing a portable terminal according to the present invention. Referring to FIG. 6, a controller 620 provides a compressed DL-MAP to a compressed information manager 640 upon receipt of a compressed DL-MAP to thereby acquire base station information or sector information without an error, as well as performing a general function of a controller such as the overall management of the portable terminal, e.g., speech communication and data communication.

The compressed information manager 640 identifies a sector or a base station based on the one-byte operator ID and the one-byte sector ID that are acquired from the compressed DL-MAP, and a preamble number that has been acquired in advance or is acquired from a current downlink frame. In short, although a sector of the current cell has the same sector ID as that of a sector of another cell, it is possible to identify if the sector is of the current cell or another cell based on the preamble number, and the result is provided to the controller 620.

A storage 630 stores programs for controlling the general operation of the apparatus and temporary data created during the executing of the programs.

An interface module 610 is a module for communication with another node and includes a radio frequency (RF) processor and a baseband processor. The RF processor converts signals received through an antenna into baseband signals and provides the baseband signals to the baseband processor, and converts baseband signals transmitted from the baseband processor into RF signals, which can be actually transmitted in the air, and transmits the RF signals through the antenna.

In the above described block structure, the controller 620 may execute the function of the compressed information manager 640. However, the embodiment of the present invention presents them separately to distinctively describe each function. Therefore, when an actual product is realized, all or part of the functions of the compressed information manager 640 may be processed in the controller 620.

Figure 7:
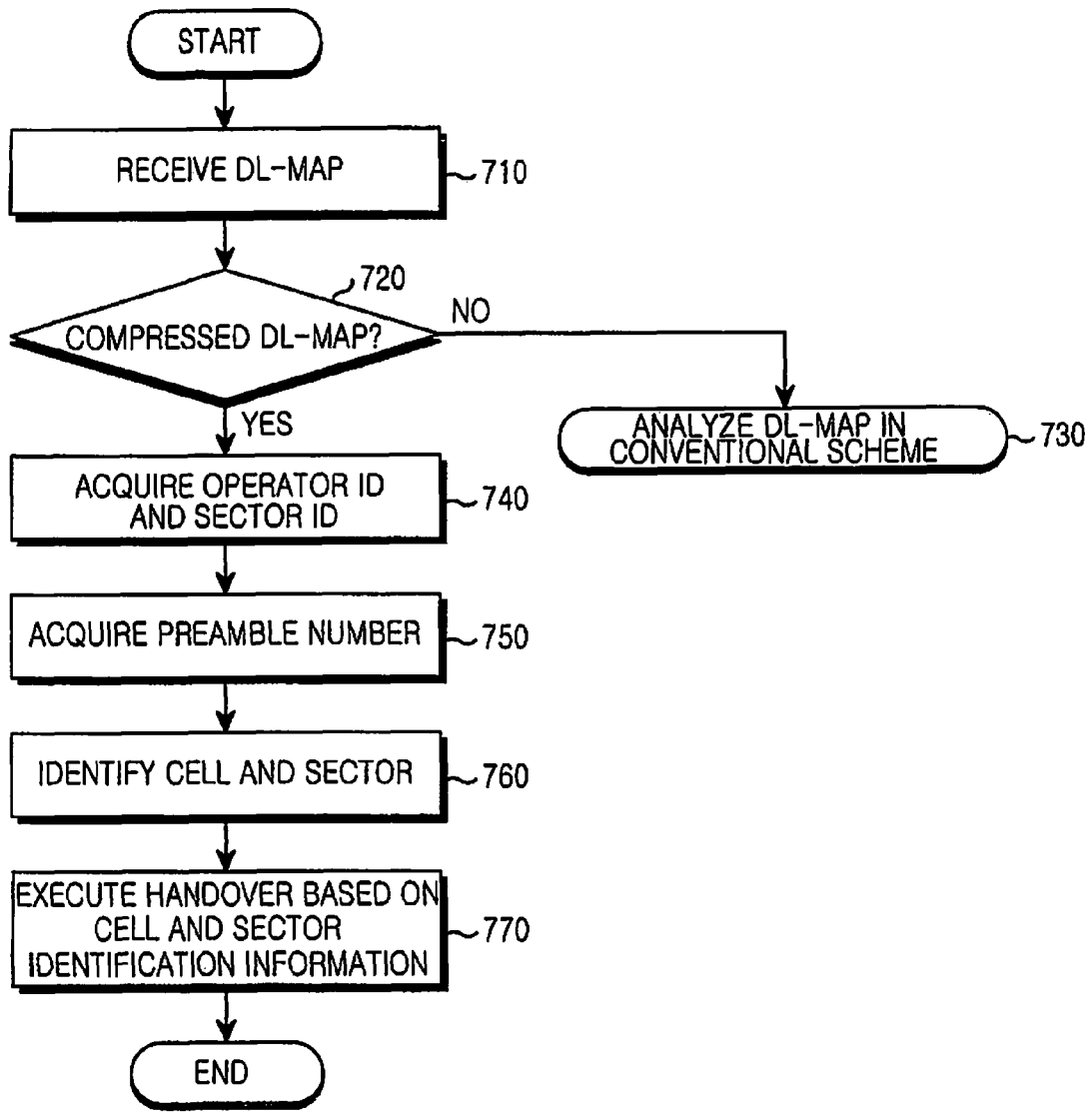
FIG. 7 is a flowchart describing a process of acquiring BS ID from compressed DL-MAP information according to the present invention.

FIG. 7 is a flowchart describing a process of acquiring BS ID from compressed DL-MAP information according to the present invention. Referring to FIG. 7, the controller of a portable terminal receives a DL-MAP in step 710. When the DL-MAP is identified as a typical DL-MAP in step 720, the controller analyzes the received DL-MAP based on a conventional scheme in step 730.

When the DL-MAP is identified as a compressed DL-MAP in step 720, the controller provides the compressed DL-MAP to the compressed information manager, and the compressed information manager acquires a one-byte operator ID and a one-byte sector ID in step 740.

Subsequently, in step 750, the compressed information manager acquires a preamble number from a downlink frame that is pre-stored or received. In step 760, the compressed information manager identifies a current cell and a sector from a handover target cell and sector, and provides the result to the controller.

In step 770, when the controller needs to perform a handover, it executes the handover based on the information of the current cell and sector, the handover target cell and sector, through a corresponding handover scheme. Subsequently, the process is then terminated.

The use of compressed DL-MAP suggested in the present invention can prevent an error in the recognition of the acquisition of cell information and sector information to thereby increase handover success rate.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the present invention has been described with respect to certain preferred embodiments, it will be apparent to those skilled in the art that various changes and modifications may be made without departing from the scope of the invention as defined in the following claims.

What is claimed is:

1. A method for performing a handover in a portable terminal based on compressed information in a broadband wireless access communication system, comprising:
   receiving, by the portable terminal, a compressed broadcast message;
   acquiring operator information and sector information from the compressed broadcast message;
   acquiring a preamble number from one of the compressed broadcast message and pre-stored information;
   identifying a target cell and a target sector based on the preamble number, the operator information, and the sector information; and
   executing inter-cell handover, when the sector of the target cell is identified as a sector of another cell.

2. The method of claim 1, further comprising:
   executing inter-sector handover, when the sector of the target cell is identified as a sector of a current cell.

3. The method of claim 1, wherein the sector of the target cell is regarded as the other sector of the other cell, when the preamble number cannot be identified with a current cell and the operator information and the sector information are identified with the current cell.

4. An apparatus for performing handover in a portable terminal based on compressed information in a broadband wireless access communication system, comprising:
   a compressed information manager for receiving a compressed broadcast message, acquiring operator information and sector information from the compressed broadcast message, acquiring a preamble number from one of pre-stored information and the compressed broadcast message, identifying a target cell and a target sector based on the preamble number, the operator information, and the sector information, and providing an identification result to a controller; and
   the controller for providing the compressed broadcast message to the compressed information manager, and executing inter-cell handover, when the sector of the target cell is identified as a sector of another cell based on the identification result.

5. The apparatus of claim 4, wherein the controller executes inter-sector handover, when the sector of the target cell is identified as a sector of a current cell based on the identification result.

6. The apparatus of claim 4, wherein the compressed information manager regards the target sector of the target cell as the other sector of the other cell, when the preamble number cannot be identified with a current cell and the operator information and the sector information are identified with the current cell.

7. An apparatus for performing handover in a portable terminal based on compressed information in a broadband wireless access communication system, comprising:
   means for receiving a compressed broadcast message;
   means for acquiring operator information and sector information from the compressed broadcast message;
   means for acquiring a preamble number from one of the compressed broadcast message and pre-stored information;
   means for identifying a target cell and a target sector based on the preamble number, the operator information, and the sector information;
   means for executing inter-cell handover, when the sector of the target cell is identified as a sector of another cell; and
   means for executing inter-sector handover, when the sector of the target cell is identified as a sector of a current cell.

8. The apparatus of claim 7, wherein the sector of the target cell is regarded as the other sector of the other cell, when the preamble number cannot be identified with the current cell and the operator information and the sector information are identified with the current cell.

9. A non-transitory computer readable recording medium having recorded thereon a computer program comprising executable instructions to be executed by a portable terminal for performing handover in the portable terminal based on compressed information in a broadband wireless access communication, comprising:
- a first code segment for receiving a compressed broadcast message;
- a second code segment for acquiring operator information and sector information from the compressed broadcast message;
- a third code segment for acquiring a preamble number from one of the compressed broadcast message and pre-stored information;
- a fourth code segment for identifying a target cell and a target sector based on the preamble number, the operator information, and the sector information;
- a fifth code segment for executing inter-cell handover, when the sector of the target cell is identified as a sector of another cell; and
- a sixth code segment for executing inter-sector handover, when the sector of the target cell is identified as a sector of a current cell.

10. The non-transitory computer-readable recording medium of claim 9, wherein the sector of the target cell is regarded as the other sector of the other cell, when the preamble number cannot be identified with the current cell and the operator information and the sector information are identified with the current cell.

11. A system for performing handover based on compressed information in a broadband wireless access communication system, comprising:
- a portable terminal for receiving a compressed broadcast message, acquiring operator information and sector information from the compressed broadcast message, acquiring a preamble number from one of the compressed broadcast message and pre-stored information, identifying a target cell and a target sector based on the preamble number, the operator information, and the sector information, executing inter-cell handover, when the sector of the target cell is identified as a sector of another cell, and executing inter-sector handover, when the sector of the target cell is identified as a sector of a current cell; and
- a base station for communicating with the portable terminal, sending the compressed broadcast message.

12. The system of claim 11, wherein the sector of the target cell is regarded as the other sector of the other cell, when the preamble number cannot be identified with the current cell and the operator information and the sector information are identified with the current cell.

* * * * *